(12) United States Patent
Ikenoue

(10) Patent No.: US 8,233,661 B2
(45) Date of Patent: Jul. 31, 2012

(54) OBJECT TRACKING APPARATUS AND OBJECT TRACKING METHOD

(75) Inventor: Shoichi Ikenoue, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/919,793

(22) PCT Filed: Dec. 26, 2008

(86) PCT No.: PCT/JP2008/004015
§ 371 (c)(1),
(2), (4) Date: Nov. 24, 2010

(87) PCT Pub. No.: WO2009/113144
PCT Pub. Date: Sep. 17, 2009

(65) Prior Publication Data
US 2011/0058708 A1   Mar. 10, 2011

(30) Foreign Application Priority Data
Mar. 14, 2008   (JP) .................................. 2008-065198

(51) Int. Cl.
*G06K 9/00* (2006.01)
*H04N 5/225* (2006.01)
(52) U.S. Cl. ........................................ 382/103; 348/169
(58) Field of Classification Search .................. 382/103, 382/107, 236; 348/169, 170, 171, 172, 208.14; 712/26, 231, 300
See application file for complete search history.

(56) References Cited

U.S. PATENT DOCUMENTS
7,437,243 B2 * 10/2008 Fujimoto ..................... 701/300

FOREIGN PATENT DOCUMENTS
| JP | 5-216988 | 8/1993 |
| JP | 11-167455 | 6/1999 |
| JP | 2007-328746 | 12/2007 |
| JP | 2007-328747 | 12/2007 |

OTHER PUBLICATIONS

International Search Report, dated Feb. 3, 2009, for International Patent Application No. PCT/JP2008/004015.
International Preliminary Report on Patentability, with translation, Issued Sep. 14, 2010, for International Patent Application No. PCT/JP2008/004015.
Michael Isard, et. al., "Contour tracking by stochastic propagation of conditional density", 1996, pp. 343-356, In. Proc. European Conf. Computer Vision, Cambridge, UK.
Michael Isard, et. al., "Condensation—conditional density propagation for visual tracking", Isard and Blake, IJCV, 1998.
Michael Isard, et. al., Incondensation: Unifying low-level and high-level tracking in a stochastic framework, Department of Engineering Science, University of Oxford, Oxford. UK.

* cited by examiner

*Primary Examiner* — Abolfazl Tabatabai
(74) *Attorney, Agent, or Firm* — Katten Muchin Rosenman LLP

(57) ABSTRACT

Candidate contour curves for a tracking object in the current frame are determined using a particle filter, based on the existence probability distribution of the tracking object in a frame which is one frame previous to the current frame. To match a candidate curve against a contour image of the current frame, a processing to search for the closest contour to the candidate curves is divided for each knot constituting the candidate contour curve and is executed in parallel by a plurality of processors. Each image data on a search region for each knot to be processed are copied from a contour image stored in an image storage to the respective local memories.

13 Claims, 12 Drawing Sheets

150

OBJECT TRACKING APPARATUS AND OBJECT TRACKING METHOD

TECHNICAL FIELD

The present invention relates to information processing techniques, and in particular to an object tracking apparatus for tracking a target object in an input image and an object tracking method performed therein.

BACKGROUND ART

Visual tracking is expected to find a broad range of applications in computer vision, especially visual surveillance in the field of security and analysis/classification and editing of recorded images in the audio-visual field, or man-machine interfacing and human-to-human interfacing, namely, television conferencing, television telephone and the like. Accordingly, much research has been conducted to improve the tracking accuracy and processing efficiency. Among other things, much conducted is a research where a particle filter is applied to the visual tracking. Here, the particle filter attracts attention as a time series analysis method for analyzing a signal added with non-Gaussian noise that a Kalman filter cannot deal with. In particular, the Condensation (Conditional Density Propagation) algorithm is well known in this research (see Non-Patent Document 1 to Non-Patent Document 3, for instance).

The particle filter is a computation technique to approximate the Bayesian filter, and represents the probability distribution of an object by introducing a finite number of particles as candidates to be tracked (tracking candidates). The probability distribution of an object is used for time-series estimation and prediction. The Condensation algorithm estimates a change over time in probability distribution about the shape of an object to be tracked (tracking object), using the particle filter. More specifically, a candidate having the same shape as that of the tracking object is expressed by a particle, and the existence probability distribution on a parameter space is estimated sequentially by the parameter transition using a motion model and observation for calculating the likelihood of the transition results.

[Non-Patent Document 1] Michael Isard and Andrew Blake: Contour tracking by stochastic propagation of conditional density, *Proc. European Conf. on Computer Vision*, vol. 1, pp. 343-356, Cambridge, UK (1996).

[Non-Patent Document 2] Michael Isard and Andrew Blake: CONDENSATION—conditional density propagation for visual tracking, *Int. J. Computer Vision*, 29, 1, 5-28 (1998).

[Non-Patent Document 3] Michael Isard and Andrew Blake: ICondensation: Unifying low-level and high-level tracking in a stochastic framework, *Proc 5th European Conf. Computer Vision*, 1998.

DISCLOSURE OF INVENTION

Problems to be Solved by the Invention

To perform visual tracking using the particle filter, it is naturally desired that a result be outputted with fast processing speed. This is a particularly vital factor when a target object in an image during an image taking is tracked in real time. In such a case, the processing required for each frame must be completed within a frame input period. Here, the processing required for each frame includes the generation and elimination of particles, matching between the contour of candidates set by each particle and an edge image of the frame, the acquisition of likelihood, the estimation of existence probability distribution, and so forth. However, as the number of tracking objects or the size thereof varies, the processing time or a resource necessary for the processing also varies. As a result, it becomes difficult to estimates those parameters and therefore it is also difficult to constantly perform the tracking processing at high speed under the optimal circumstance.

The present invention has been developed in view of the foregoing problems and a purpose thereof is to provide a visual tracking technique having a high scalability wherein the efficiency of tracking processing is less likely to be affected by a change in a tracking object.

Means for Solving the Problem

One embodiment of the present invention relates to an object tracking apparatus. The object tracking apparatus comprises: a candidate contour determining unit configured to determine a candidate contour of an object to be tracked in a second image frame based on an estimated existence probability distribution of the object in a first image frame, the first image frame and the second image frame being in an image stream, the image stream constituting captured moving image data on the object to be tracked; an observing unit configured to observe a likelihood of the candidate contour by matching the candidate contour determined by the candidate contour determining unit against an edge image of the second image frame; and a result acquiring unit configured to estimate the existence probability distribution of the object in the second image frame, based on the likelihood observed by the observing unit, the observing unit including: a plurality of search units configured to perform, in parallel and for each knot, a processing to search for a nearest edge from each knot constituting a curve of the candidate contour; and a likelihood acquiring unit configured to acquire the likelihood for each candidate contour by integrating the results of search obtained by the search units.

In the above-described embodiment, the "first image frame" and the "second image frame" may be frames adjacent to each other or those located separately away from each other in a image stream. In the general tracking of an object in the forward direction of the time axis, the "first image frame" is a frame before the "second image frame" in terms of time but the present embodiments are not limited thereto.

The "existence probability distribution" may be an existence probability distribution in the position coordinates within an image frame of a target object or an existence probability distribution in a space of parameters that represent any of attributes, such as the shape, color and size of an object, or a combination thereof. The "candidate contour" is a figure that represents candidates of contour of the target object in part or whole. The "likelihood" is a degree to which the candidate contour is similar to the object. For example, such a degree includes numerical values representing the degree of overlapping between the contour and the object and the distance from the object.

Another embodiment of the present invention relates to an object tracking method. The object tracking method comprises: determining a candidate contour of an object to be tracked in a second image frame based on an estimated existence probability distribution of the object in a first image frame, the first image frame and the second image frame being in an image stream, the image stream constituting captured moving image data on the object to be tracked; generating an edge image of the second image frame and storing the edge image thereof in a memory; performing, in parallel and for each knot, a processing to detect a nearest edge from each knot, constituting a curve of the candidate contour, in a manner such that image data on a partial region of the edge image stored in the memory is read out and searched; and acquiring a likelihood for each candidate contour by integrating the results of edge detection so as to estimate the existence probability distribution of the object in the second image frame.

Optional combinations of the aforementioned constituting elements, and implementations of the invention in the form of methods, apparatuses, systems, computer programs, recording media recording the computer programs, and so forth may also be effective as additional modes of the present invention.

Advantageous Effects

The present invention achieves a high-speed visual tracking technique having a high scalability.

EXPLANATION OF REFERENCE NUMERALS

Figure 1:
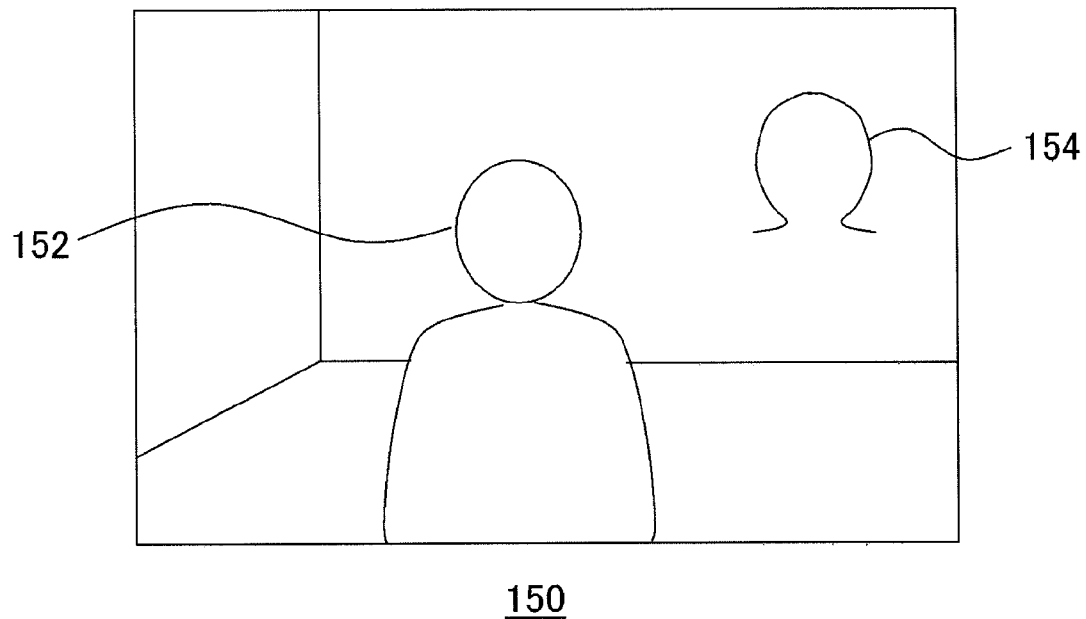
FIG. 1 illustrates a visual tracking method where a person is an object to be tracked.

10 Visual tracking system
12 Image pickup apparatus
14 Tracking apparatus
16 Display unit
20 Image acquiring unit
22 Contour image generator
24 Image storage
26 Tracking processor
28 Tracking start/end determining unit
29 Sampling unit
30 Observing unit
34 Result acquiring unit
36 Result storage
40 Output control unit
50 Contour image clipping unit
52 Contour search task queue
54 Likelihood acquiring unit
56 Contour search unit
58a First processor
60a Local memory
62 Smoothing filter
64 Coarse-gradating unit
66 Edge extraction filter

BEST MODE FOR CARRYING OUT THE INVENTION

First Embodiment

Visual tracking using a particle filter will be first described to clarify the features and advantageous effects of the present embodiment. FIG. 1 illustrates a visual tracking method where a person is an object to be tracked (tracking object). An image stream of moving images, such as live-action moving images and those generated by employing computer graphics or the like, is comprised of image frames. An Image showing people 150 is one of such image frames, and a person 152 is captured in the people image 150 as a tracking object.

In order to track the motion of the person 152, the head and shoulder contours of the person 152 are approximated by an omega-shaped curve 154 where the omega-shaped curve 154 is described by a known representation. On the other hand, the people image 150 including the person 152 is subjected to an edge extraction processing, and an edge image thereof is obtained beforehand. The shape and the position of the curve 154 are then varied by varying the parameters defining the curve 154, and an edge near the curve 154 is detected. Thereby, a value of parameter estimated to best match the head contour of the person 152 is identified. The above processing is repeated for each frame, so that the tracking of the person 152 proceeds. In this case, the edge is generally defined to be a position at which the density and/or color change drastically in an image.

A probability distribution prediction technique using the particle filter is implemented to compute the matching between various types of curves 154 and the head contour of the person 152. In other words, candidates to be tracked (tracking candidates) are narrowed down by increasing or decreasing the number of samplings for the curve 54 according to the probability distribution of a target object, on a parameter space, in the previous frame. As a result, areas having higher existence probability can be focused and therefore the accurate matching can be done efficiently.

A detailed description of how to apply the particle filter to the tracking, which focuses on the contour of a target object, is given in Non-Patent Document 3 (Michael Isard and Andrew Blake: ICondensation: Unifying low-level and high-level tracking in a stochastic framework, *Proc 5th European*

*Conf. Computer Vision*, 1998), for instance. A description is given below by directing attention to points relative to the present embodiment.

The omega-shaped curve 154 is first described by B-spline curves. The B-spline curve is defined by a control point sequence of n control points (Q0, . . . , Qn) and a knot sequence of n knot values (s0, . . . , sn). These parameters are preset to draw a basic curve shape, namely an omega shape in this case. The basic curve obtained by this setting is hereinbelow called "template Q0". Though the shape described by the template Q0 is an omega shape when the person 152 in the people image 150 of FIG. 1 is to be tracked, the shape is varied depending on a target object. For example, the shape will be a circular shape if the target object is a ball, whereas the shape will be a palm shape if the target object is a palm.

Next, a shape-space vector x is prepared as transformation parameters used to vary a template. The shape-space vector x is constituted by six parameters as follows.

$$x = (\text{shift}_x, \text{shift}_y, \text{extend}_x \cos\theta - 1, -\text{extend}_y \sin\theta, \text{extend}_y \sin\theta)^T \quad \text{Eq. (1)}$$

In Equation (1), ($\text{shift}_x$, $\text{shift}_y$) is a translation amount in (x, y) direction, ($\text{extend}_x$, $\text{extend}_y$) is a magnification, and $\theta$ is a rotation angle. Using an operational matrix W by which to operate the shape-space vector x on the template $Q_0$, a curve after transformation, i.e., a candidate curve Q, is described as follows.

$$Q = W_x + Q_0$$

$$W = \begin{pmatrix} 1 & 0 & Q_0^x & 0 & 0 & Q_0^y \\ 0 & 1 & 0 & Q_0^y & Q_0^x & 0 \end{pmatrix} \quad \text{Eqs. (2)}$$

Using Equations (2), the template can be translated, expanded/contracted and rotated by appropriately varying six parameters that constitute the shape-space vector x. Also, a combination of these operations allows a candidate curve Q to vary its shape and position in various manners.

Edges of the person 152 lying close to each knot are searched for each of a plurality of candidate contours expressed by varying the parameters of the template $Q_0$, such as an interval in the knot sequence, and the six parameters constituting the shape-space vector x. Then the likelihood of each candidate contour is calculated from the distance between an edge and the knots, and the like. The probability density distribution in a sixth-dimensional space of the six parameters constituting the shape-space vector x is estimated based on the thus calculated likelihoods.

Figure 2:
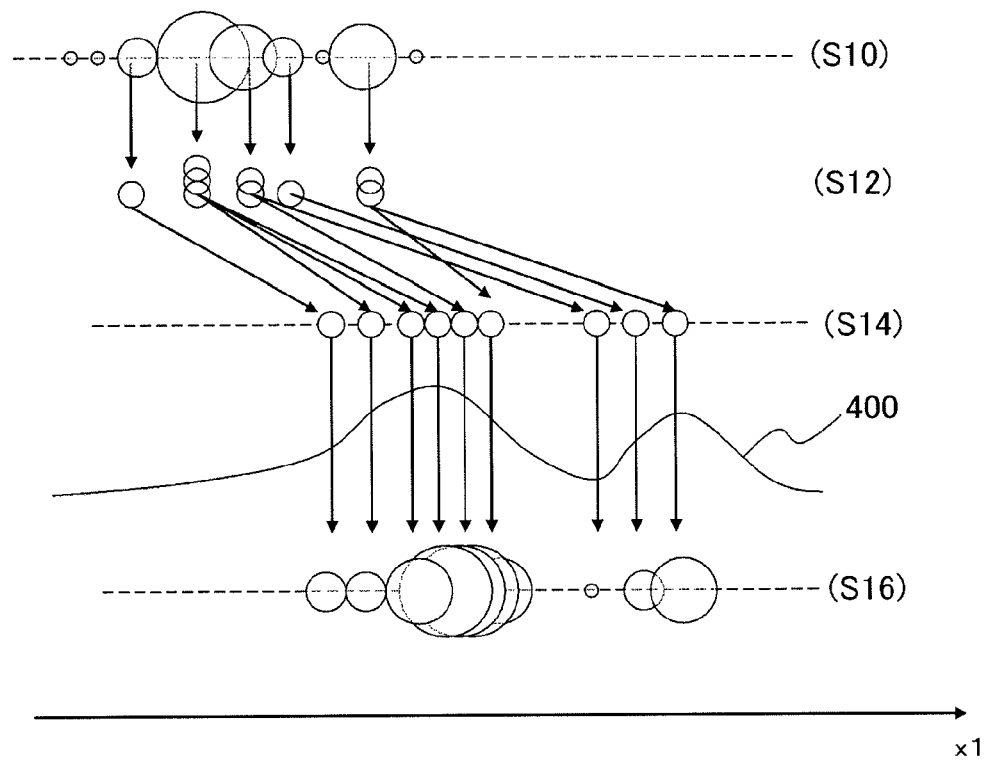
FIG. 2 illustrates a method for estimating a probability density distribution using a particle filter.

FIG. 2 illustrates a method for estimating a probability density distribution using the particle filter. For ease of understand, in FIG. 2 the horizontal axis shows a parameter x1 which is one of the six parameters constituting the shape-space vector x. However, in fact, the other parameters are also processed in the same manner as the parameter x1 in the six dimensional space. It is assumed here that the image frame for which one wants to estimate the probability density distribution is an image frame at time t.

Particles at time t are generated (S12) using the probability density distribution, on the axis of the parameter x1, estimated in an image frame at time t−1 which is one frame previous to the image at time t (S10). If there are already particles through a filtering, whether the particles are to be divided or eliminated will be determined. The probability density distribution expressed in S10 is discretely calculated in accordance with the coordinates on the parameter space, and it is indicated in a manner such that the larger the circle, the higher the probability density will be.

The particles are a substantiation of the value of the parameter x1 to be sampled and the sampling density. For example, a high probability density region of parameter x1 at time t−1 is described by particles with a high density, so that sampling is focused thereon; a low probability density region is described with a reduced number of particles, so that the sampling number is small. This allows for efficient matching by generating a large number of candidate curves near the edge of the person 152, for example.

Then, the particles are made to transit on a parameter space using a predetermined motion model (S14). The predetermined motion model includes a Gaussian motion model and an autoregression prediction motion model, for instance. The former is such that a probability density at time t shows a Gaussian distribution around each probability density at time t−1. The latter is a method assuming an autoregression prediction model, whose degree is two or above, obtained by sample data. For example, based on the variation in parameters in the past, it is estimated that the person 152 moves at a constant speed. In the example of FIG. 2, a motion in a positive direction of parameter x1 is estimated through the autoregression prediction motion model, and each particle is made to transit accordingly.

Then, edges of the person 152 in the vicinity of candidate curves determined by the respective particles are searched using the edge images at time t so as to calculate the likelihoods of the respective candidate curves, which in turn estimates the probability density distribution at time t (S16). As described earlier, the estimated probability density distribution discretely shows a true probability density distribution 400, as shown in S16. By repeating the above-described steps after this, the probability density distribution at each time is expressed in the parameter space. For example, if the probability density distribution is unimodal, namely, if there is only one tracking object, a curve resembling closest to the tracking object will be obtained in such a manner that the sum of weighted parameters using the thus calculated probability densities is defined to be the final parameter.

A probability density distribution $p(\hat{x}_t^i)$ at time t estimated in S16 is calculated as follows.

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad \text{Eq. (3)}$$

In Equation (3), i is a unique particle number, $p(\hat{x}_t^i|\hat{x}_t^i, u_{t-1})$ is a prescribed motion model, and $p(y_t|\hat{x}_t^i)$ is a likelihood.

Figure 3:
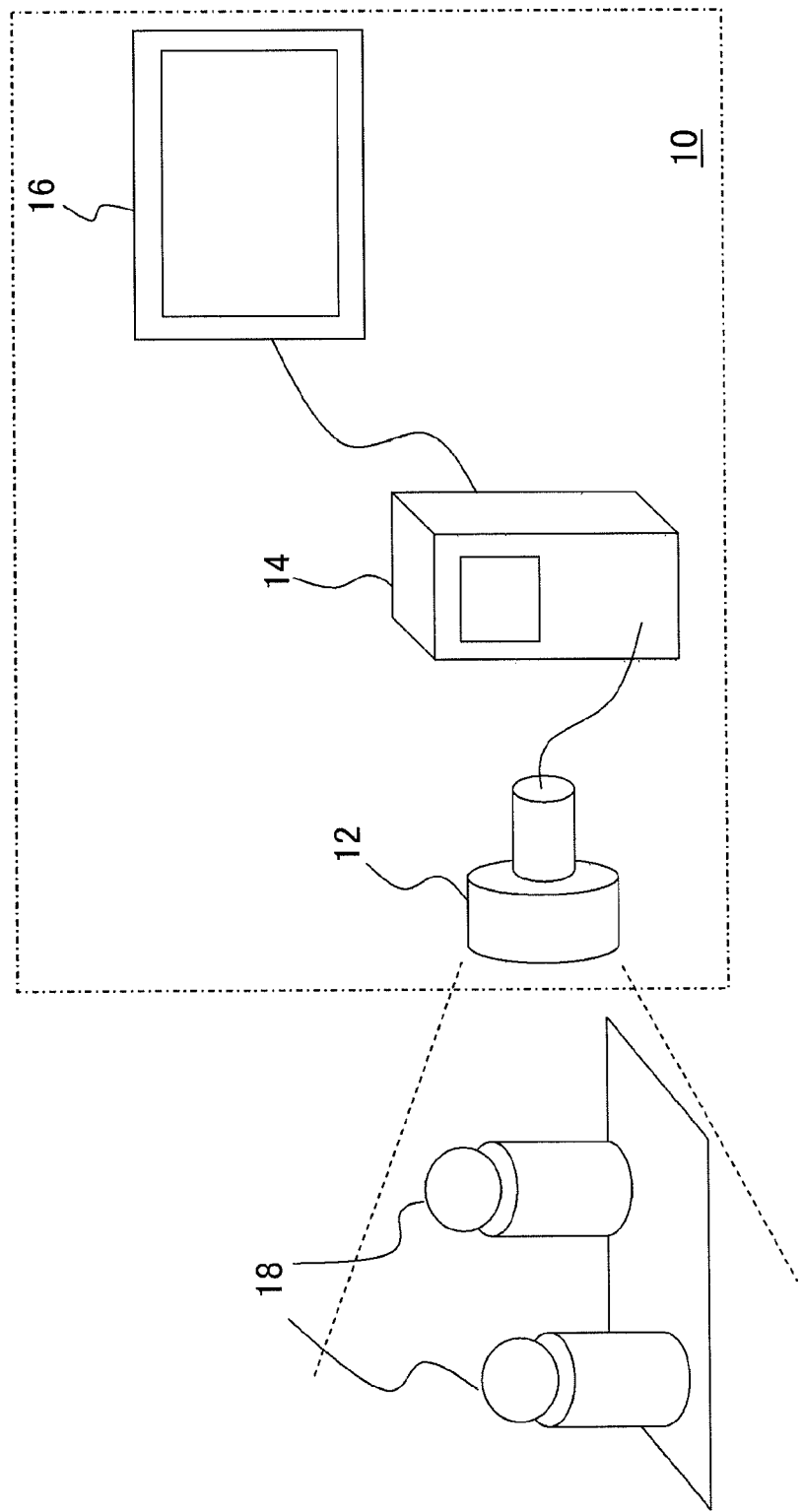
FIG. 3 shows an exemplary structure of a visual tracking system according to a first embodiment.

FIG. 3 shows an exemplary structure of a visual tracking system according to the present embodiment. The visual tracking system 10 includes an image pickup apparatus 12 for taking the images of an object to be tracked (tracking object) 18, a tracking apparatus 14 for performing a tracking processing, and a display unit 16 for outputting data of images picked up by the image pickup apparatus 12 and data of tracking results. The tracking object 18 may be a person, an object, a part thereof, or the like that varies depending on the intended use of the visual tracking system 10 but assume in the following description that it is a person as in the above-described case.

The connection between the tracking apparatus 14 and the image pickup apparatus 12 or the connection between the tracking apparatus 14 and the display unit 16 may be achieved through a wired or wireless means, or the connection may be made via any other various types of networks. Alternatively, any two of or all of the image pickup apparatus 12, the tracking apparatus 14 and the display unit 16 may be combined together and integrally provided. Depending on a use environment, the image pickup apparatus 12 and display unit 16 may not be connected to the tracking apparatus 14 simultaneously.

The image pickup apparatus 12 acquires image data at a predetermined frame rate. The image data includes images of the tracking object 18 or images at a specific place with or without the tracking object 18 included therein. The image data acquired is inputted to the tracking apparatus 14 and the tracking object 18 is subjected to a tracking processing. The processing result is outputted to the display unit 16 as output data under the control of the tracking apparatus 14. The tracking apparatus 14 may also serve as a computer that performs other functions, and the tracking apparatus 14 may achieve various functions using the data, obtained as a result of the tracking processing, such as information on the position and the shape of the tracking object 18.

Figure 4:
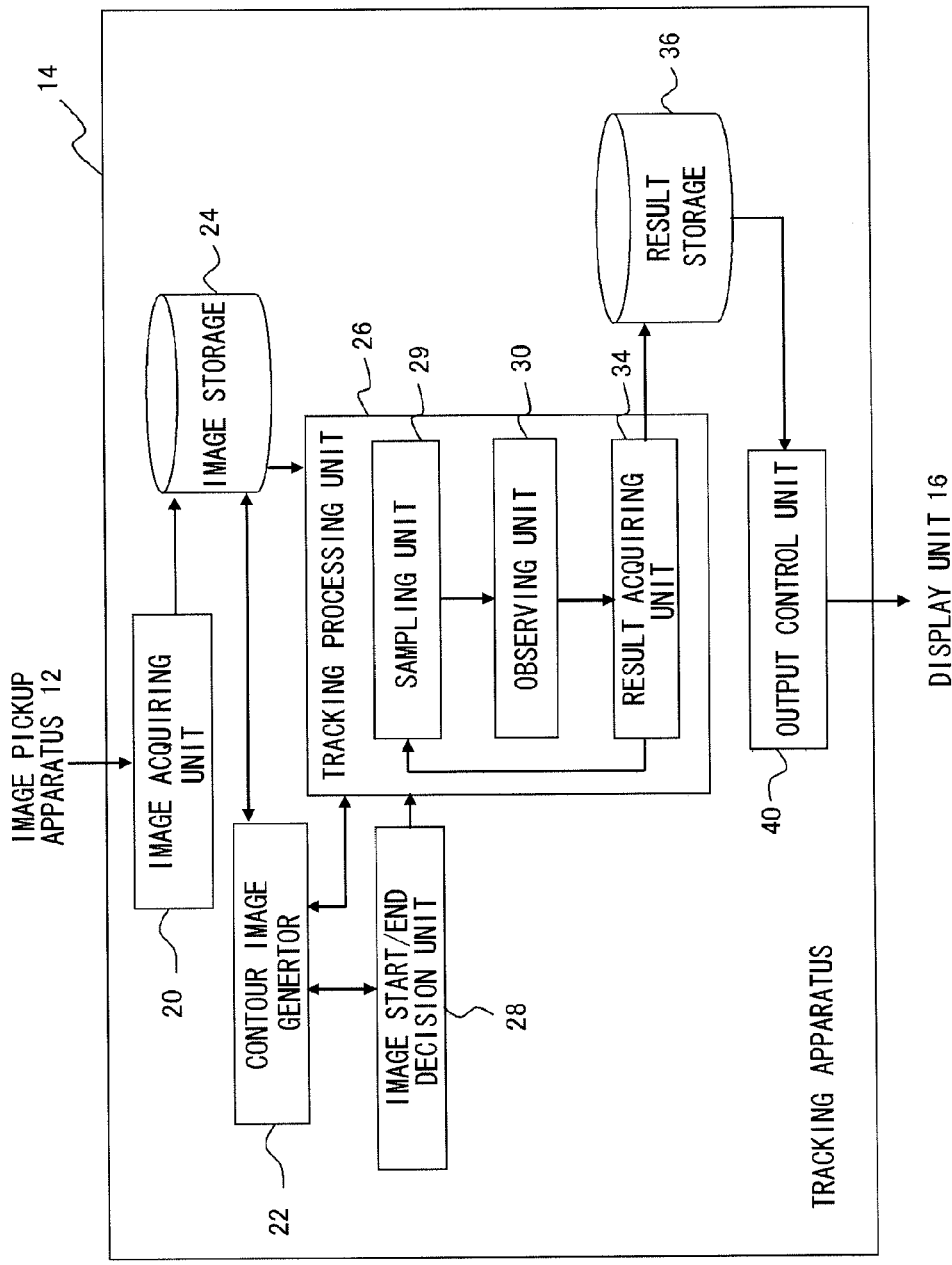
FIG. 4 shows a detailed structure of a tracking apparatus according to a first embodiment.

FIG. 4 shows a detailed structure of the tracking apparatus 14 according to the present embodiment. The tracking apparatus 14 includes an image acquiring unit 20 for acquiring the image data inputted by the image pickup apparatus 12, an image storage 24 for storing the input image data and contour image data, a contour image generator 22 for generating contour images from the input image data, a tracking start/end determining unit 28 for determining the start and end of tracking, a tracking processor 26 for performing the tracking process using a particle filter, a result storage 36 for storing final tracking result data, and an output control unit 40 for controlling the output of the tracking result to the display unit 16.

Each element shown in FIG. 4 and described as a functional block for performing various processings may be implemented hardwarewise by a CPU, memory and other LSIs, and softwarewise by image processing programs or the like. Therefore, it is understood by those skilled in the art that the functional blocks may be implemented by a variety of manners including hardware only, software only or a combination of both, and are not limited to any particular one.

The contour image generator 22 extracts a contour of a tracking object from image frames of the input images so as to generate a contour image. The contour image is stored in the image storage 24 and will be used later when the likelihood of candidate curves is observed by the observing unit 30 of the tracking processor 26. Normally, the "contour" is treated as an "edge" in an edge image. Thus, in the conventional technique, the likelihood thereof is observed using the "edge image". However, since many edges other than the contours of an object may be extracted depending on an input image when an ordinary edge extraction filter is used, it is speculated that the likelihood thereof may not be accurately observed when the matching is computed between the candidate curves and the edges other than the contours. Also, if the number of edges is reduced by setting a threshold value for the edge extraction high, the contour will break up and therefore the likelihood thereof may still not be accurately observed.

Thus, the contour image generator 22 according to the present embodiment focuses attention on not an ordinary "edge image" but, in particular, the "contour" of an object in an input image so as to generate an image with which to accurately observe the likelihood thereof. Though a specific method will be described later, an image generated by the contour image generator 22 is called a "contour image", in the following description, which will be distinguished from the ordinary "edge image". Also, the contour image generator 22 may implement a foreground extractor (not shown) using a background difference. As a preprocessing in the contour image generation processing, a foreground containing the tracking object may be extracted from the input image so as to efficiently extract the contour of the tracking object.

The tracking start/end determining unit 28 evaluates the contours or the shape of foreground obtained by the contour image generator 22 and determines whether the tracking be started or terminated, based on a predetermined condition. The "end" of the tracking may include a temporary stoppage due to occlusion or the like. The tracking starts for example when the tracking object enters the viewing angle of the image pickup apparatus or appears from behind something, whereas the tracking is terminated for example when the tracking object leaves the viewing angle of the image pickup apparatus or disappears into a hidden place. When it is determined that the tracking be started, the tracking start/end determining unit 28 informs the tracking processor 26 accordingly and has it start the tracking processing.

The tracking processor 26 includes a sampling unit 29, an observing unit 30, and a result acquiring unit 34. The sampling unit 29 generates and eliminates particles based on the probability density distribution estimated for an image frame at time t−1 which is one frame previous to the image at time t. Then, all of the particles are made to transit on the parameter space by applying a predetermined motion model to said particles. As a result, a plurality of candidate curves for an image frame at time t are determined. The sampling unit 29 starts the processing upon receipt of a signal indicating a tracking start from the tracking start/end determining unit 28, whereas the sampling unit 29 terminates the processing upon receipt of a signal indicating a tracking end.

The observing unit 30 observes the likelihood of a candidate curve defined by each particle that the sampling unit has generated/eliminated and transited. For example, for each of the knots belonging to the B-spline curve representing the candidate curve defined by each particle, a contour lying closest among the contour images generated by the contour image generator 22 is searched and the distance thereto is obtained so as to score knots by complying with a predetermined rule. Then the likelihood of the candidate curve is calculated based on the scores of all knots constituting the candidate curve. The observing unit 30 performs this search processing in parallel using a plurality of processor units.

In the present embodiment, though a detailed description will be given later, tasks to be executed after the division of search processing for contours per knot is defined to be a unit of processing (e.g., predetermined executable tasks) and is processed in parallel by a plurality of processor units. To search for a contour closest to each knot, each processor unit copies only the image data on a partial region containing said knot and its search region to a subordinate local memory. By repeating this processing by each processor unit, the units of processing, of which amount is [(the number of particles)× (the number of knots constituting a candidate curve)], is processed in a short period of time. The score for each knot obtained by each processor unit in parallel is integrated for each candidate curve and then the likelihood of candidate curve is calculated. The conventional technique may be employed as a method for acquiring the scores and calculating the likelihood thereof.

The result acquiring unit 34 calculates the probability density distribution $p(\hat{x}_t^i)$, as shown in Eq. (3), based on the likelihood observed by the observing unit 30. Then the result acquiring unit 34 calculates and gathers a tracking result such as data on the curve obtained by parameters that are subjected to a weighted averaging, and stores the tracking result in the result storage 36. The result acquiring unit 34 sends back the data to the sampling unit 29 so that the data can be used in the tracking processing for the next time t+1. The data stored in the result storage 36 may be any one of the value of each parameter which has been subjected to the weighted averaging, data on an image constituted by the only curve determined by the parameter value or a composite image of the curve and the input image, and the like.

If there are a plurality of tracking objects, the result acquiring unit 34 may further track the tracking objects using templates prepared for the respective tracking objects and combine the respective tracking results so as to derive a single tracking result. Also, a case where a plurality of tracking objects are overlapped with each other is detected, if any, from the tracking result. In this case, the following measure is taken, for example. That is, tracking objects hidden behind some other objects are precluded, with predetermined timing, from the tracking objects to be processed. As a result, the output of any unsuitable tracking results can be prevented even if a tracking object gets hidden behind another tracking object and therefore the observation likelihood degrades temporarily.

Each frame undergoes the above-described processings performed by the contour image generator 22 and the tracking processor 26, with the result that the moving image data including the tracking results, for example, are stored in the result storage 36. In this case, outputting the moving image data to the display unit 16 under the control of the output control unit 40 enables the curves in the templates to move similarly to the motion of the tracking object. As described above, the tracking results may not only be displayed as moving images but also undergo other processings as appropriate, such as outputting them to another operation module, according to any intended use of the tracking.

An operation of the tracking apparatus 14 employing the above-described structure will now be described below. A description is given of an exemplary case where a person located in a certain place is tracked. In this example, the image pickup apparatus 12 takes images of the subject place, at a predetermined frame rate. The images taken are inputted to the image acquiring unit 20 in the tracking apparatus 14 as input image data and stored in the image storage 24. In such a condition as this, the following tracking processing is executed.

Figure 5:
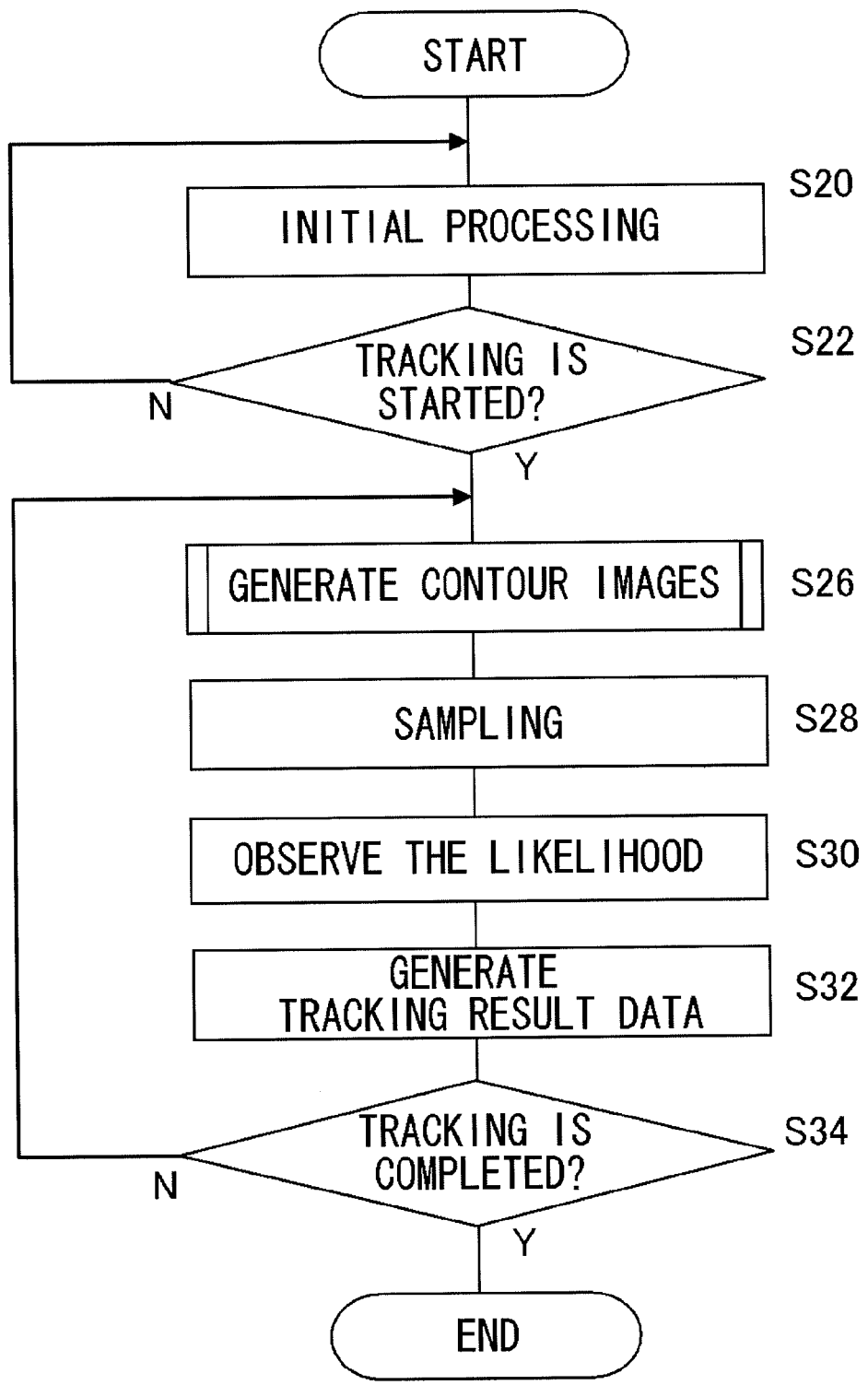
FIG. 5 is a flowchart showing a procedure of a tracking processing in a first embodiment.

FIG. 5 is a flowchart showing a procedure of the tracking processing in the present embodiment. In the case of this example, the tracking object is a person and therefore, as described earlier, an omega-shaped template is prepared and ready to be used in the tracking apparatus 14. The representation method of template is not limited to B-spline curves and may be any other description forms as long as they can express a desired curve. Also the method for transforming the template shape may be selected as long as it is capable of flexible transformation by varying several kinds of parameters, as above-described technique, and also suitable for its description form.

First, the tracking start/end determining unit 28 reads the input image data stored in the image storage 24, for each frame, and determines whether to start the tracking or not (S20 and S22). For example, if an object, having a predetermined size and shape, which can be estimated as a person appears in a foreground extracted from an image frame, the decision to start the tracking will be made. The size and the shape of a foreground serving as decision criteria are specified, in advance, theoretically or experimentally. A not-shown foreground extractor mounted on the contour image generator 22 may be used in the extraction of the foreground. In such a case, the tracking start/end determining unit 29 makes a request to the contour image generator 22 to extract the foreground. Or the tracking start/end determining unit 28 may implement the foreground extractor, instead.

Steps S20 and S22 are repeated until it is determined that the tracking be started. If it is determined that the tracking be started (Y of S22), the tracking processor 26 will start the tracking processing. Assume herein that the time corresponding to an image frame the tracking of which is permitted to start is t=0 and the subsequent image frames correspond to times t=1, 2, 3, . . . , respectively. First, the sampling unit 29 makes a request to the contour image generator 22 to generate a contour image and thereby the contour image generator 22 generates a contour image of the image frame at t=0 (S26). At this time, the sampling unit 29 may request the generation of contour images of the subsequent frames as well and thereby the contour image generator 22 may generate contour images successively.

Then the sampling unit 29 performs sampling by arranging the particles equally in a predetermined region of the parameter space, for example (S28). The observing unit 30 computes the matching between a candidate curve defined by each particle and a contour image, and thereby observes the likelihood of the candidate curve (S30). The result acquiring unit 34 calculates an initial value $p(\hat{x}_0^i)$ of the probability density distribution by use of Eq. (3) (S32).

At the same time, the contour image generator 22 reads an image frame at time t=1 and generates a contour image (N of S34 and S26). The sampling unit 29 generates particles on the parameter space according to the initial value $p(\hat{x}_0^i)$ of the probability density distribution and then performs sampling by transiting the respective particles based on a predetermined motion model (S28). The number of particles to be generated is controlled in consideration of processing load estimated based on the amount of operation resources available in the tracking apparatus 14, a desired rate of result output, and the like. The motion model is decided beforehand by selecting one with a high tracking accuracy from among the Gaussian motion model, the autoregression prediction motion model and the like according to the type of a tracking object.

Then the observing unit 30 observes the likelihood $p(y_t|\hat{x}_t^i)$ of each candidate curve defined by each particle after transition (S30). The likelihood is observed in a manner such that a contour in the neighborhood of each candidate curve is searched using a contour image at time t=1 generated by the contour image generator 22. In so doing, as described earlier, the search processing is allocated to a plurality of processors per knot. The detail thereof will be discussed later.

Then the result acquiring unit 34 calculates the probability density distribution $p(\hat{x}_1^i)$ at time t=1 based on the observed likelihood. If there are a plurality of tracking objects, the above-described processing will be performed on all of the tracking objects. Then, the result acquiring unit 34 finally determines an omega-shaped curve, which is obtained by subjecting the respective parameters to weighted averaging using the probability density distribution $p(\hat{x}_1^i)$, as the shape and the position of the tracking objection at time t=1. Then, the result acquiring unit 34 generates desired tracking data, for example, by generating the data of image by superimposing the curve on the original input image frame, and stores the thus generated data in the result storage (S32).

Next, the tracking start/end determining unit 28 determines whether to further continue or terminate the tracking processing (S34). For example, if an object, having a predetermined size and shape, which can be estimated as a person does not appear in a foreground for a predetermined duration of time, it will be determined that the tracking be terminated. Or, if a tracking object gets behind another tracking object on the real space and so forth and this state of occlusion continues for a predetermined duration of time, it will be determined that the tracking be terminated. The state of occlusion may be deduced from the tracking results in the past or may be detected by a not-shown distance measuring system. Moreover, if the tracking object continues to be out of the viewing angle of the image pickup apparatus 12 for a predetermined duration of time, this will also be detected using the same technique used in the detection of the above-described occlusion state and then the tracking will be determined to be terminated.

If it is determined in S34 that the tracking processing not be terminated (N of S34), a contour image will be generated from the image frame at time t=2. At the same time, the particles are generated or eliminated using the probability density distribution $p(\hat{x}_1^i)$ at time t=1 calculated in S32. Also, the particles are made to transit using a motion model. Then, the likelihood is observed for the frame at time t=2 and the probability density distribution is calculated. These processes correspond to S26 to S32. Then, the processings S26 to S32 are repeated for each frame before the tracking start/end determining unit 28 determines that the tracking be terminated in S34. As a result, moving image data, in which an omega-shaped curve, having the same shape as that of a visitor (tracking object), changes along the time axis in the same way as the visitor's head moves, are stored in the result storage 36. The output control unit 40 outputs the moving image data to the display unit 16, a module providing other functions, or the like, so that the user can use the tracking result in a desired form.

Figure 6:
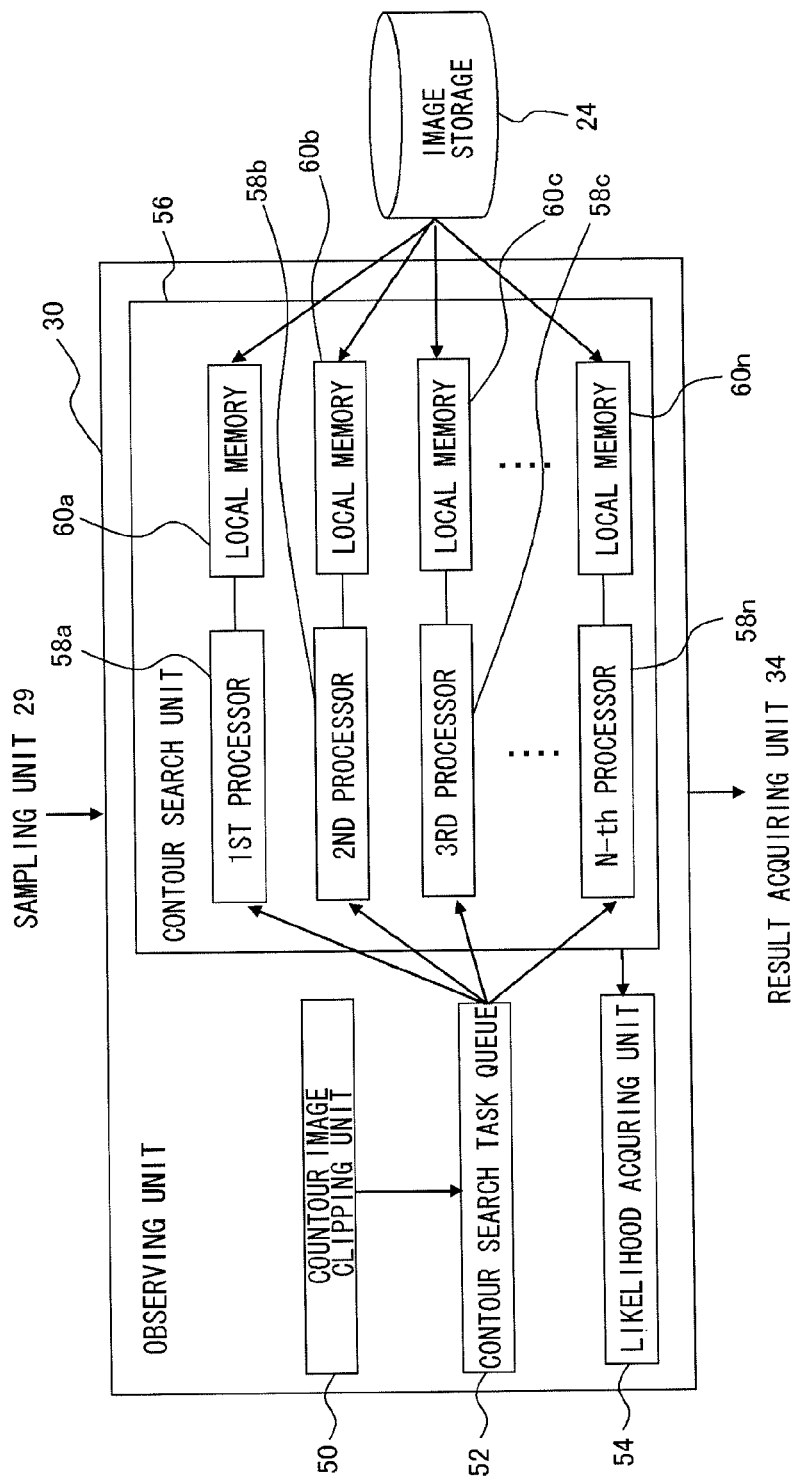
FIG. 6 shows a further detailed structure of an observing unit in a first embodiment.

A description is next given of a process of S30 in which the observing unit 30 computes the matching between a candidate curve and a contour on a contour image. FIG. 6 shows a further detailed structure of the observing unit 30. The observing unit 30 includes a contour image clipping unit 50, a contour search task queue 52, a contour search unit 56, and a likelihood acquiring unit 54. The contour image clipping unit 50 cuts out a region associated with each knot from the contour image, based on the coordinates of the knot belonging to a curve representing the candidate curve. In this case, the region associated with each knot indicates a region including said knot and a search region for said knot. The region associated with each knot may be equivalent to the search region and will be hereinafter referred to as "search region" also. Then a processing request, for a contour search, containing the coordinate information on the knot and the information on the corresponding region is issued. The issued processing request is added to a processing queue in the contour search task queue 52.

The contour search unit 56 includes N processor units, which are a first processor 58*a*, a second processor 58*b*, a third processor 58*c*, . . . , and an Nth processor, and N local memories 60*a*, 60*b*, 60*c*, . . . , and 60*n*, which are connected to the N processing units, respectively. Each processor unit reads a contour search processing request successively from the contour search task queue 52 and conducts the contour search processing on requested knots. More specifically, each processor unit copies image data on a region specified by the processing request to a subordinate local memory from the contour images stored in the image storage 24. Then, it searches a contour closest to the knot within the region copied to the local memory, based on the coordinate information on the specified knot, and scores the knot according to a predetermined rule.

A commonly-used edge search method may be used to search for the contours. The search region may be appropriately determined based on the selected search method or an accuracy required for matching. After the first processor 58*a*, the second processor 58*b*, the third processor 58*c*, . . . , and the Nth processor 58*n* have executed a processing request, they output the scoring result to the likelihood acquiring unit 54. Then the next contour search processing request is read from the task queue 52 and the same processing is repeated.

The likelihood acquiring unit 54 calculates the likelihood for each candidate curve by integrating the respective scores of knots inputted from the first processor 58*a*, the second processor 58*b*, the third processor 58*c*, . . . , and the Nth processor 58*n* of the contour search unit. More specifically, the scores of all the knots in a candidate curve are gathered together and summed up, or the average value thereof is calculated or they are substituted into a predetermined conversion equation. The scores are outputted in sequence from each processor unit of the contour search unit 56. The information associating the identification information on the candidate curves with the identification information on the knots belonging to each candidate curve is commonly stored in the observing unit 30. Thus, the results can be integrated for each candidate curve by adding necessary information to the processing request and/or scores when the processing request and/or scores are to be outputted.

Figure 7:
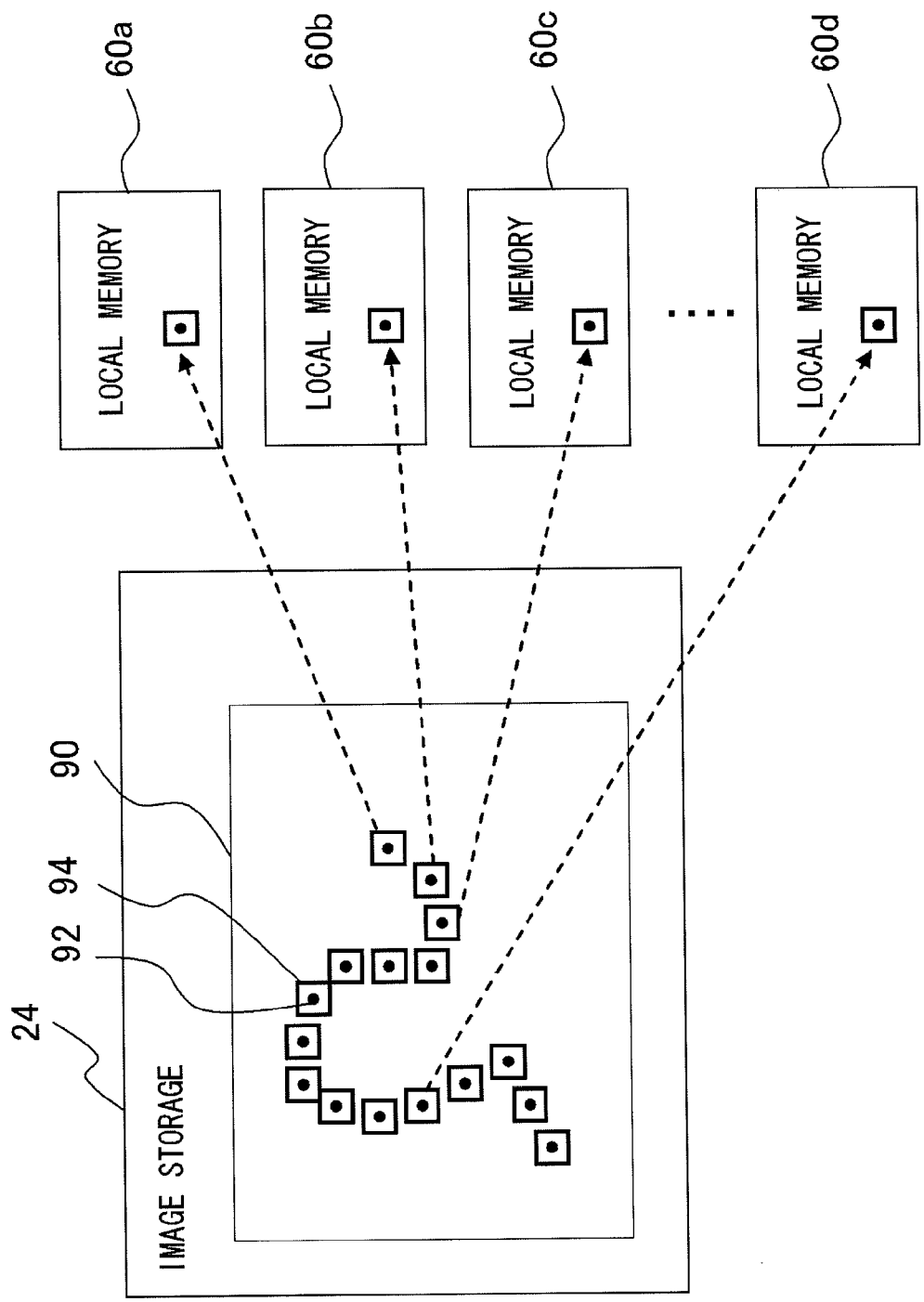
FIG. 7 schematically illustrates how, in a first embodiment, image data on a region cut out of contour images stored in an image storage is copied to each local memory.

FIG. 7 schematically illustrates how the first processor 58*a*, the second processor 58*b*, the third processor 58*c*, . . . , and the Nth processor 58*n* copy the image data on a specified region to their own local memories 60*a*, 60*b*, 60*c*, . . . , 60*d* from a contour image stored in the image storage 24, according to a contour search processing request. First, the contour image 90 generated by the contour image generator 22 is stored in the image storage 24. Then, the coordinates of each of the knots 92 belonging to a candidate curve are defined by a particle determined by the sampling unit 29.

As the contour image clipping unit 50 acquires the coordinates of knots 92, the contour image clipping unit 50 cuts out the search region 94 for each knot. How to determine the search region is determined in consideration of accuracy, memory capacity, processing speed and the like. In the example of FIG. 7, a square with the coordinates of a knot 92 as the center of gravity is cut out as the search region 94. It is preferable from the viewpoint of search accuracy that the size of the search region 94 be varied according to the magnitude of a candidate curve. For example, the maximum data size of the search region 94 relative to the possible maximum magnitude of a candidate curve is so set as to be equal to the maximum data size storable in the copy storing area of the local memories 60*a*, 60*b*, 60*c*, . . . , and 60*d*. The search region 94 is varied according to the ratio of the magnitude of the candidate curve, thereby determining the size of the square. The magnitude of the candidate curve can be obtained based on the magnification (extend$_x$, extend$_y$) which is a parameter among those each particle has.

How to determine the search region 94 is not limited to the way shown in FIG. 7. As will be discussed later, the size thereof and so forth may be varied in consideration of the time for copying the image data on the region to the local memories 60*a*, 60*b*, 60*c*, . . . , and 60*d*, the time for search processing and the like. Also, the knot does not need to be located at the center of gravity of the search region 94. For example, the motion of a tracking object may be estimated using the autoregression prediction model used when the particles are made to transit according to the motion model. And the search region 94 may be wider in the direction toward which the tracking object is estimated to move. Also, the search region 94 may not be a square, and instead it may be of other shapes, such as a rectangle or rhombus, or may be composed of pixels arranged in row and/or column.

The image clipping unit 50 enters the contour search processing request into the contour search task queue 52. Here, the contour search processing request contains the information on the coordinates of the knot 92 and the information on search region 94 corresponding thereto, for example, the information on the coordinates of a corner of a square and the length of a side thereof. As the first processor 58a, the second processor 58b, the third processor 58c, . . . , and the Nth processor 58n of the contour search unit load a contour search processing request from the contour search task queue 52, each processor copies the image data on square regions only, to a subordinate local memory from the contour image 90 stored in the image storage 24, based on the information on squares contained in the contour search processing request.

In the present embodiment, a unit of processing is set per knot and therefore the amount of data required for each unit of processing is set in a restrictive manner. That is, as compared with the case where the search of contours for a candidate curve is set as a unit of processing, by dividing the search process per knot, the amount of data for the search region is markedly reduced and the search is less likely to be affected by the size of the candidate curve. As a result, the image data required for searching are storable in the local memory regardless of the size of the tracking object. The local memory has generally a small capacity but is accessible at high speed. Accordingly, setting the search region per knot and copying the image data on said region only realize high-speed tracking processing together with an advantageous effect of parallel processing. Any information processing apparatus having a plurality of processors can achieve this advantage. If particularly structured as above, the present embodiment can be easily applicable to the information processing apparatus that implements "heterogeneous multicore".

The "heterogeneous multicore" is an information processing apparatus that implements different kinds of cores, and is characterized by the features that the capacity of memory used by each core is small, data required for the processing need to be copied to memory of each core and so forth. Once the search region 94 is set as described above, the size of the image data can be made smaller than the memory capacity occupied by each core. Thereby, the present embodiment is applicable to the heterogeneous multicore, so that the high-speed tracking processing can be achieved without regard to the apparatus to be used.

Note here that any of the plurality of processor units achieving the functions of the first processor 58a to the Nth processor 58n may also function as the contour image clipping unit 50 and/or the likelihood acquiring unit 54. Further, each function other than that of the observing unit 30 included in the tracking apparatus 14 may also be achieved by any of the plurality of processor units.

Figure 8:
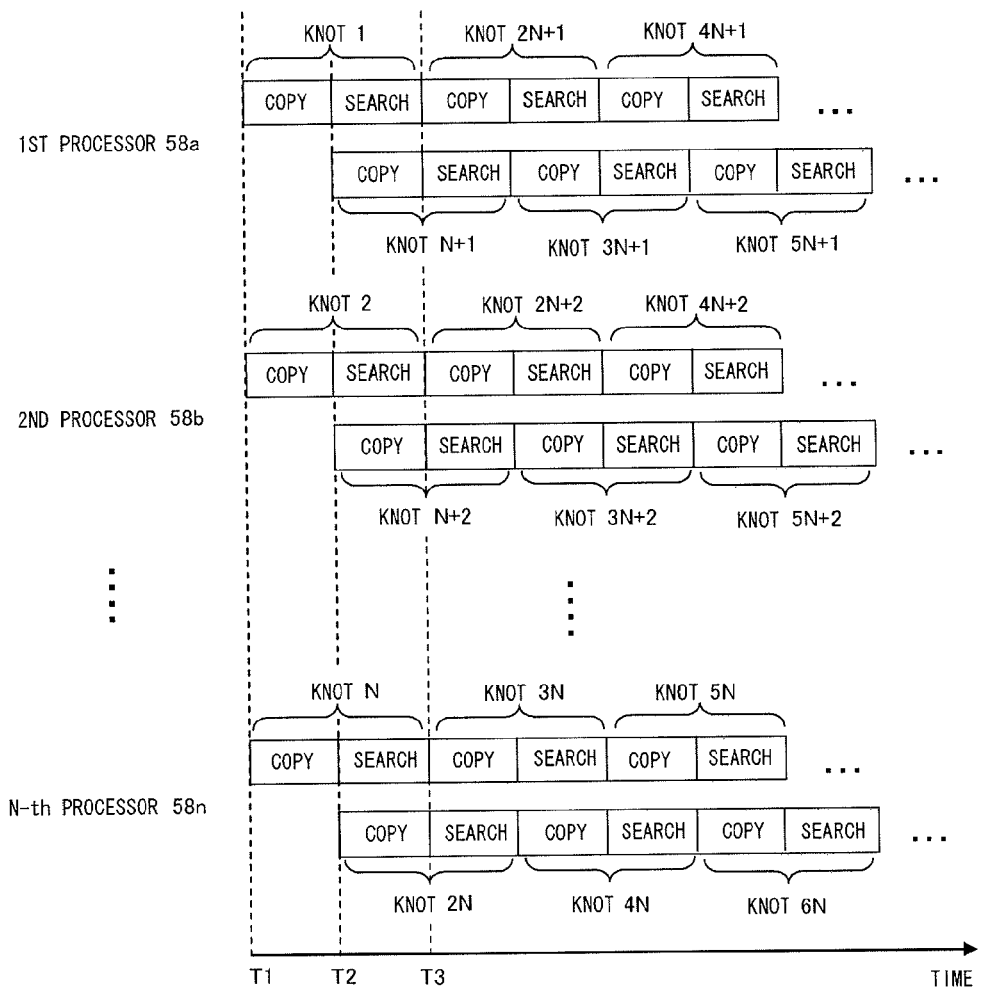
FIG. 8 schematically illustrates a process transition when a first processor, a second processor, . . . , and an Nth processor of a contour search unit carry out contour search processing in a first embodiment.
Figure 10:
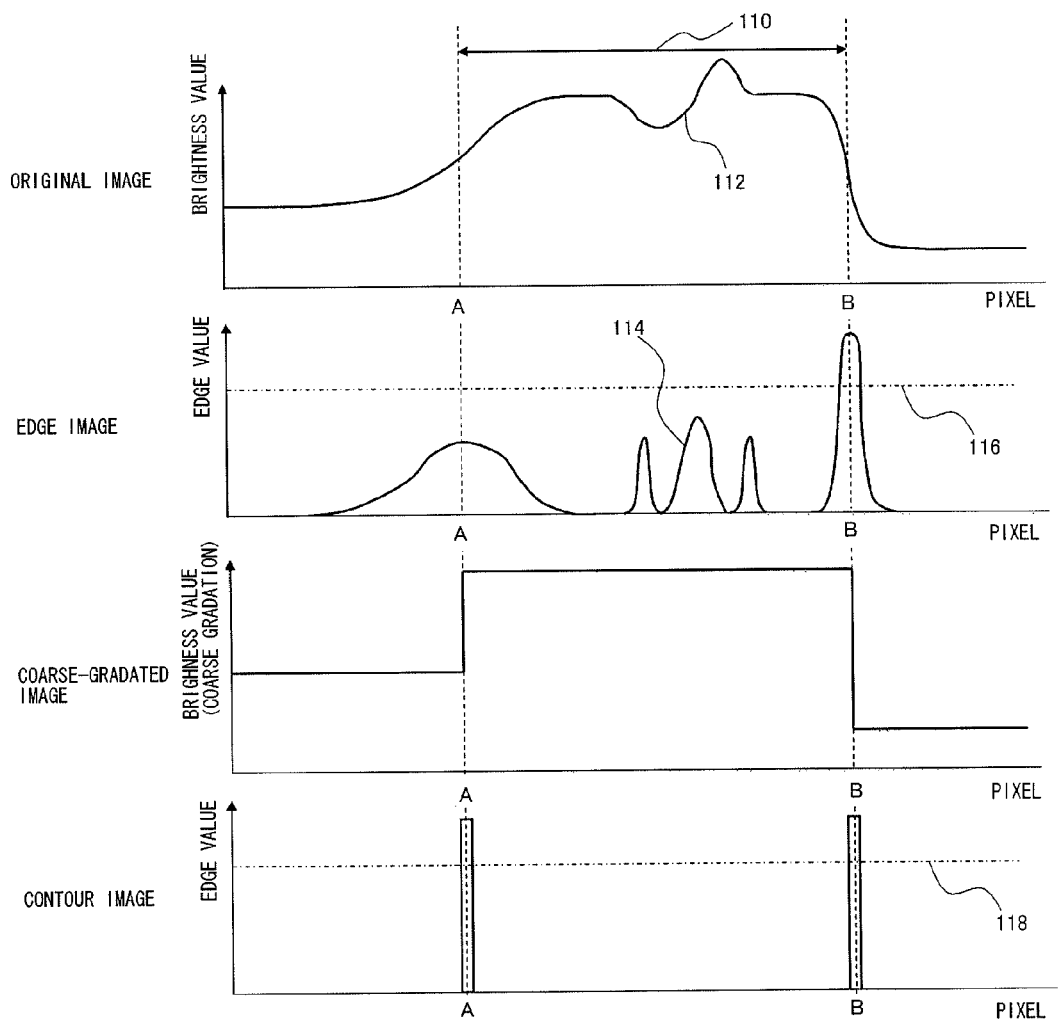
FIG. 10 shows graphs to explain differences between a general edge extraction processing and a contour image generation processing in a first embodiment.

FIG. 8 schematically illustrates a process transition when the first processor 58a, the second processor 58b, . . . , and the Nth processor 58n of the contour search unit 56 carry out contour search processing. The horizontal line extending rightward in FIG. 10 is the time axis. Starting from time T1 onward, N processors which are the first processor 58a to the Nth processors 58n respectively execute the search processing request about knot 1, knot 2, . . . , and knot N of a candidate curve. As the search processing request is read from the contour search task queue 52, each processor copies the image data on the region specified by the search processing request to the subordinate local memory from the contour images stored in the image storage 24, and starts search processing. In FIG. 8, the time for copying and the time for searching are expressed by rectangles, respectively.

In the present embodiment, a pipeline processing is executed in such a manner that while the search for a contour about a knot is conducted, copying a region specified by a search processing request read next from the contour search task queue 52 starts. With this pipeline processing, the processing time can be further reduced. In the example shown in FIG. 8, at time T1, the first processor 58a starts copying the image data on a region corresponding to the knot 1. Similarly, at time T1, the second processor 58 starts copying the image data on a region corresponding to the knot 2, . . . , and the Nth processor 58n starts copying the image data on a region corresponding to the knot N, respectively. At time T2 when the copying ends, the search for a contour within the copied region starts. At this time, the first processor 58a, the second processor 58b, . . . , and the Nth processor 58n start copying the search regions of knot N+1, knot N+2, . . . , and knot 2N, for which search processing requests are issued next to that for the knot N and sequentially thereafter, respectively, by the pipeline processing.

Then, at time T3 when the search processing for the previous knot has ended and the copying of the search region for the next knot has ended, the search for contours within the copied regions starts. Thereafter, each processor repeats the copying and the search processing in such a manner that each processor starts copying the next region during the search. In this manner, the time for the copying processing arising from the parallelization of the search processing can be minimized and therefore the improvement of processing speed realized by the parallel processing and the high-speed access to the local memories can be achieved more efficiently.

FIG. 8 shows a case where the time for copying and the time for search processing are almost identical to each other but the present embodiment is not limited thereto. In other words, it is preferable that copying a region of the next processing object starts with any of timings in a time zone during which the contour search processing is in effect on the previous region, and the search processing is performed on the next region when the previous search has ended and the copying has ended. Note here that if, as shown in FIG. 8, the time for copying and the time for search processing are almost identical to each other, the overhead otherwise caused by a case for example where the search processing cannot be started due to incompletion of copy can be absorbed. If the contour search is to be conducted on all the knots by copying the contour images as a whole, the time for copying the data on images whose size is large will be first required; the above-described method and structure can reduce the processing time in whole as compared with this case.

In the light of what is described above, the size of a search region may be adjusted so that the time for copying and the time for search processing are almost equal to each other. For example, an experiment may be carried out for each of search regions of various sizes using test images having similar image structures. And a number of cycles required for each processing may be measured and the size of region to be cut out may be determined so that the numbers of cycles are approximately equal each other. In this case, a feedback control may be performed in the following manner. That is, the contour image clipping unit 50 controls the contour search unit 56 so as to have the contour search unit 56 to actually perform the search processing. The feedback control is performed by acquiring the time for copying and the time for search processing in such a manner that the most efficient size of the search region can be determined.

Similarly, the size of a region to be cut out may be adjusted from another viewpoint. For example, where the target object in an image during an image taking is tracked in real time, the time permitted to be spent for the likelihood observation may be limited. Under such a condition, as the number of tracking objects increases, the time for contour search spent for each knot must be reduced. In this case, too, an experiment is carried out prior to the actual tracking processing to adjust the size of a region and reduce the size thereof. Hence, the time for copying and the time for search processing can be reduced. Alternatively, the size of a search region may be determined in the following manner. That is, a table in which the optimal size of a search region for the number of various tracking objects is prepared beforehand; the contour image clipping unit 50 references this table when the number of tracking objects has been acquired after the start of tracking.

The table may also be prepared based on diversified factors, for example, parameters which affect the ease of tracking, such as the shape of candidate contour, the complexity of motion and the contrast of images, and required tracking accuracy, etc. besides the number of tracking objects.

Figure 9:
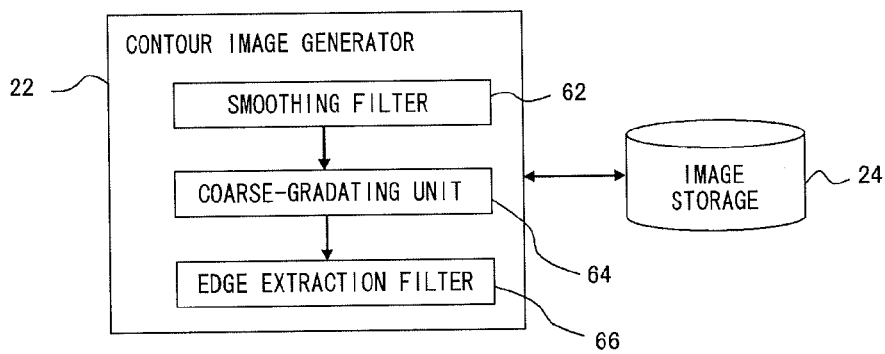
FIG. 9 shows a detailed structure of a contour image generator in a first embodiment.

A description is next given of a processing in which the contour image generator 22 generates contour images. FIG. 9 shows a detailed structure of the contour image generator 22. The contour image generator 22 includes a smoothing filter 62, a coarse-gradating unit 64, and an edge extraction filter 66. The contour image generator 22 reads the image frames of the input image stored in the image storage 24 and generates a contour image through a process of smoothing by the smoothing filter 62, a process of coarse-gradating by the coarse-gradating unit 64 and a process of edge extraction by the edge extraction filter 66 in this order.

The principle of how the contour image generator 22 generates contour images is as follows. FIG. 10 shows graphs to explain differences between a general edge extraction processing and a contour image generation processing in the present embodiment. All horizontal axes shown in FIG. 10 indicate the position of pixels, namely the pixel arrangement, and the range of pixels is common to all of graphs. A graph on the top tier of FIG. 10 represents the distribution of brightness values of an original image being an input image. This graph shows an example where the image of a tracking object lies in a region 110 indicated by the arrows, and it shows a sequence of pixels where a contour of the tracking object seems to exist in pixel A and pixel B.

In this example, the brightness values of the original image are distributed such that the rate of change in the brightness values near the pixel A is smaller than the rate of change in the brightness values near the pixel B in terms of their positions. This may often happen because the color resembles between the tracking object and the background near the pixel A, the pixel A side only is in shadow, and so forth. Also, it is observed through this graph that the brightness value does not stay constant within the region 110 and that the brightness value varies and fluctuates as represented by an irregularity 112 due to, for example, change in color or formation of shadow inside the image of the tracking object.

To generate an edge image of the original image indicating the distribution of such brightness values, an edge is extracted by filtering the original image through a commonly-used edge extraction filter such as a Laplacian filter. In so doing, a threshold value is set for the magnitude of change of brightness value relative to the image plane, and a point where the change exceeding the threshold value occurs are extracted as an edge. The second tier of FIG. 10 is a graph showing a case where the edge image is thus generated. That is, the magnitude of change rate in brightness value as shown in this graph is calculated as the edge value and a point having the edge values exceeding the threshold value 116, namely the pixels in the vicinity of the pixel B are extracted as the edge.

On the other hand, in the example of FIG. 10, the edge value of pixels near the pixel A which is the other contour is smaller than the threshold value 116 and therefore the pixels will not be extracted as the edge. To extract the vicinity of the pixel A as the edge, the threshold value 116 needs to be set to a smaller value. However, in such a case, a point 114 will also be extracted as the edge wherein the point 114 has relatively large edge values due to the irregularity 112 but has nothing to do with the edge. According to the present embodiment, candidate curves are set for the contour of the tracking object and then matched against the actual contour, and thereby the likelihoods of the candidate curves are observe and the position of the tracking object is estimated. Thus, if the contour has a missing part that should have been extracted as part of the contour or, conversely, if many lines other than the contour are extracted, the tracking accuracy will naturally deteriorate. To track the objects with a high accuracy, the optimal threshold value with which such adverse conditions can be avoided must be found. However, such an optimal value may vary image by image or the optimal value may not exist in the first place depending on images.

Thus, the present embodiment enables extraction of the "contour of an object" rather than "edges in an image", by loosely capturing an object as surfaces rather than the detailed information such as lines and gradation in an image. More specifically, as represented in the third tier of FIG. 10, a coarse-gradated image is generated through a process of coarse-gradating the brightness values of the original image. In the coarse-gradated image in FIG. 10, the brightness values of the original image are represented by three gradation levels for easier understanding. Then, the brightness value in the region 110 where the tracking object exists changes discontinuously from the brightness values of the other regions, irrespective of the change in the brightness value on the image plane, such that the brightness value becomes information representing the existence of the tracking object as the region.

The coarse-gradated image passed through the edge extraction filter produces edge values as shown in the fourth tier of FIG. 10, which has values only in portions where the coarse-gradated brightness value changes discontinuously. With these edge values, the portions where the edge values are prominent are limited, so that it is not necessary to strictly optimize the threshold value 118, which makes it easier to obtain a contour image.

The contour image generator 22 having a configuration as shown in FIG. 9 first smoothes an image frame of an input image by the smoothing filter 62. The smoothing filter 62 to be used may be a commonly-used smoothing filter such as a Gaussian filter, median filter, simple averaging filter or low-pass filter. Through this process, redundant high-frequency components are removed to make it easier to grasp the surface of an object as a region. Next, a coarse-gradated image as described above is generated by a coarse-gradating unit 64. The coarse-gradating unit 64, which can be realized by an ordinary bit shift operation, divides the brightness values by predetermined boundaries and converts the brightness values within each division into a single brightness value. In doing so, the division may be made equally from the lowest brightness value, or the division may be made by creating a color histogram of an image frame such that the number of pixels is equalized by the boundaries of brightness values. A general technique of posterization may also be used. As for the number of gradation levels of the coarse-gradated image, there may be, for example, 8 to 32 gradations.

Also, the number of gradation levels in the coarse-gradated image may be reset according to the tracking object, the background, the content or type of image, and the like. In such a case, the number of gradation levels that can generate a contour image with the greatest accuracy or that never fails in tracking is found by testing some coarse-gradated images of various number of gradation levels using test images similar to ones used in the actual tracking. Next, a contour image is generated by passing the coarse-gradated image generated by the coarse-gradating unit 64 through the edge extraction filter 66. The edge extraction filter 66 that can be used may be a commonly-used edge extraction filter such as a Laplacian filter, Sobel filter or Canny edge filter. Thus a binary image having different values between the contour portions and the other parts is obtained as a contour image.

Figure 11:
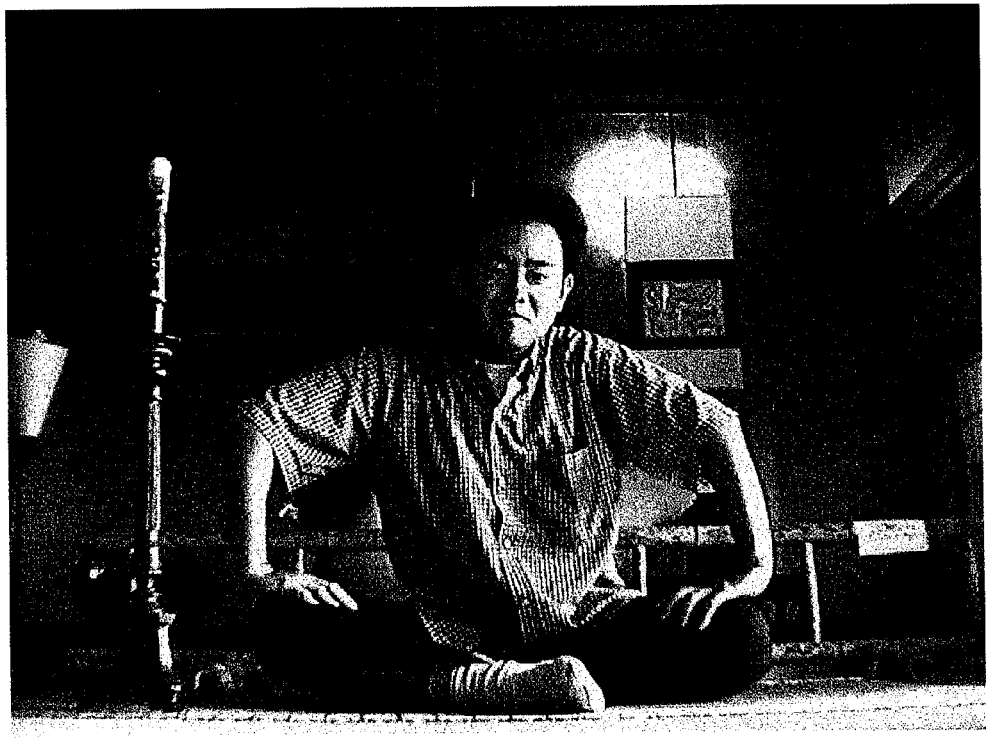
FIG. 11 shows an example of an original image which is an object to be processed.
Figure 12:
FIG. 12 shows an edge image generated by applying a common edge image generating technique to the original image of FIG. 11.
Figure 13:
FIG. 13 shows an edge image generated by applying a common edge image generating technique to the original image of FIG. 11.

Next, the results of a contour image generating technique of the present embodiment applied to an actual image are introduced together with common edge images. First, FIG. 11 shows an example of an original image which is the object to be processed. FIGS. 12 and 13 show the results of edge images generated by applying a common edge image generating technique to the original image. FIG. 12 represents a case of an edge image with a low threshold value, whereas FIG. 12 represents a case with a high threshold value. In FIG. 12, one can first see a number of extracted edges of not only the contour of a person who is the subject but also the pattern on and creases in his/her clothes and some regions of his/her face, and therefore it is not easy to distinguish the contour from all the edges. Also, the left side of the person's head is in the shadow where few edges are extracted. With the threshold value made higher, there will be fewer edges extracted and almost no contour extracted as shown in FIG. 13.

Figure 14:
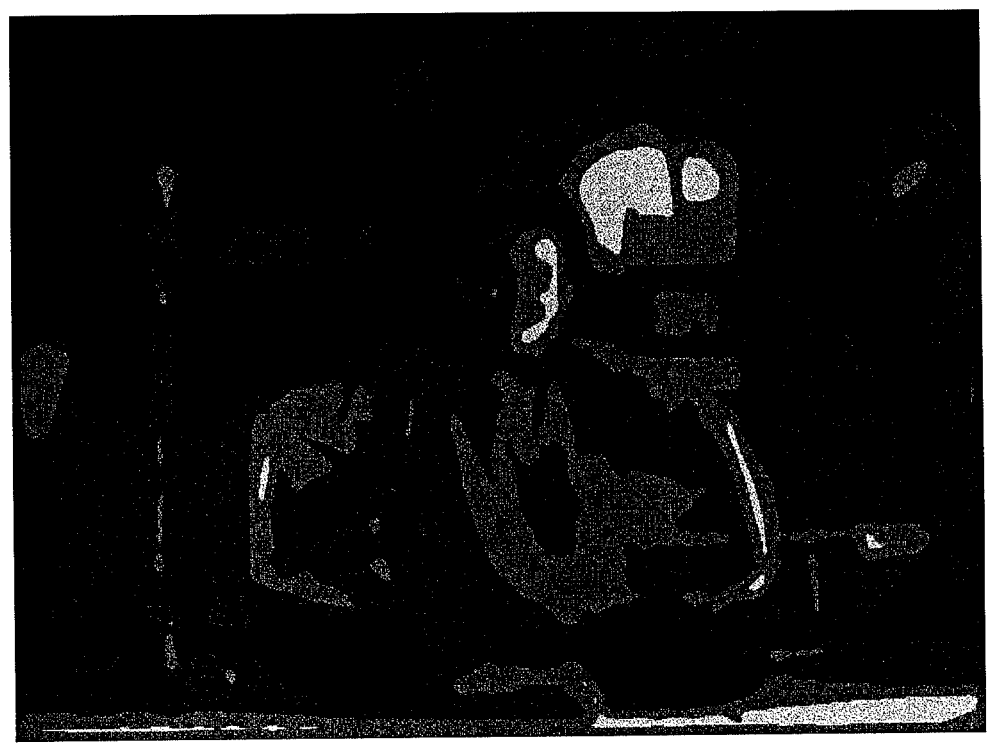
FIG. 14 shows a coarse-gradated image obtained, as an intermediate image, by subjecting the original image of FIG. 11 to a contour image generation processing in a first embodiment.
Figure 15:
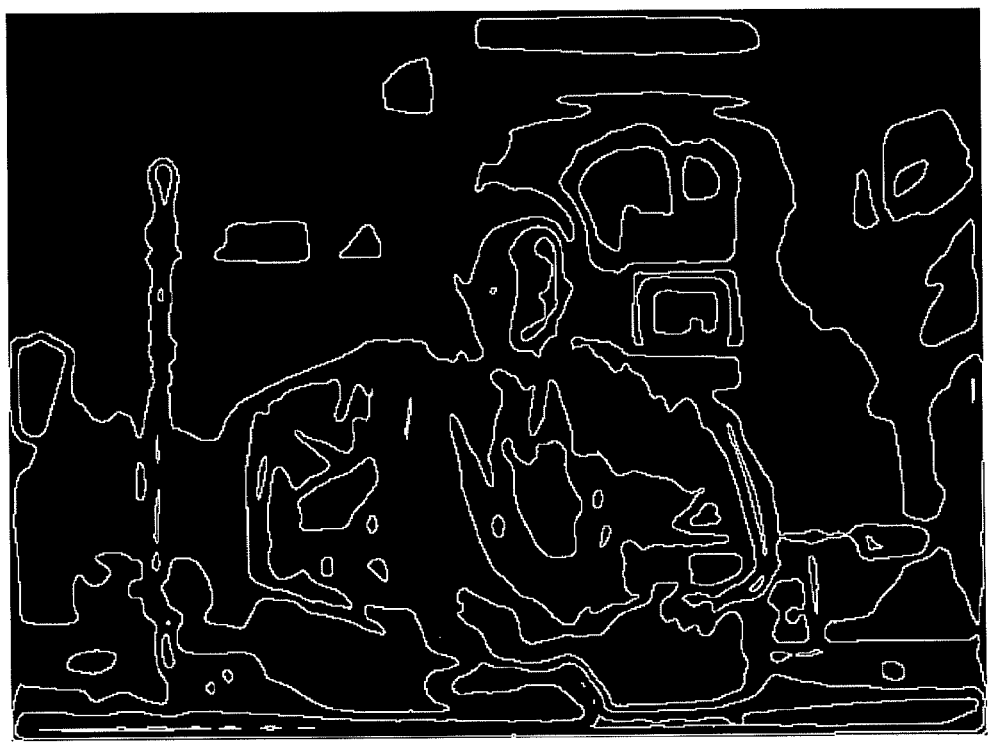
FIG. 15 shows a contour image that is generated by performing an edge extraction processing on the coarse-gradated image of FIG. 14.

FIG. 14 shows a coarse-gradated image that can be obtained by processing the original image of FIG. 11 by the smoothing filter 62 and the coarse-gradating unit 64 of the contour image generator 22 according to the present embodiment. As FIG. 14 shows, the coarse-gradated image is an image in which detailed information, such as the pattern on the clothes as seen in the edge image of FIG. 12, is eliminated and the surfaces of the person and objects are captured as regions. FIG. 15 shows a contour image that is generated by performing an edge extraction processing on the coarse-gradated image by use of the edge extraction filter 66. In FIG. 15, one can see that the contours of the person and objects are delineated by nearly continuous lines and the contour of the left side of the person's head, whose edges are not extracted in FIG. 12, is extracted.

In the present embodiment, whose principal aim is to track the motion of a person or an object in an image, the presence of contours and the positional information thereon are preferentially sought rather than the detailed information regarding the image on the pixel level. Therefore, the motion of the target object can be detected correctly without mistaking or losing sight of it. The process of coarse-gradating, with an intent of dividing an image roughly into regions according to the brightness values, considers the boundaries of the resulting regions as contours. Hence, it is easy to search for such contours that are continuous without breaks.

Also, ordinary edge images are often such that the pixels with the edge value exceeding the threshold value appear in a certain width. This is because, as shown in the second tier of FIG. 10, an ordinary edge value varies nearly continuously in multiple tone and reaches the peak with a certain width. And the lower the threshold value 116 is set in order to extract edges more certainly, the wider the edges to be extracted will be. The image from which the contour image is generated according to the present embodiment, on the other hand, is such that there is a great change of gradation levels between neighboring pixels and the edge value peaks within a single pixel. Thus the portion is extracted pixel by pixel, so that the results of extraction are represented by lines. If an edge has a width, a process for thinning the edge will be required to achieve a matching with a candidate curve. With the contours of the present embodiment, however, there is no need for such process, and hence a high-speed tracking processing can be accomplished with a simple structure.

According to the above-described embodiment, when the likelihood of each particle is observed by the visual tracking apparatus using the particle filter, attention is directed to the knots of candidate curves defined by the respective particles. Then the processings of contour search are divided for the respective knots, and they are allocated to a plurality of processors, which conduct parallel processings. Since the processing of contour search is done independently for each knot, allocation to the processors and integration of the results are easy. Also, since the image data necessary for a contour search processing for a single knot are limited to a region near the knot, the data size is small, and each processor can perform the contour search processing by copying the data to the local memory. Thus, the contour image data can be accessed at high speed, which further improves the processing speed.

By cutting out a region of a size that can be copied to a local memory from a contour image of the original moving images, this embodiment can be applied to an information processing apparatus having a structure premised on processing by copying data to each core as in heterogeneous multicore processors. This will allow high-speed processing regardless of the structure of an apparatus even in the object tracking processing with high-quality images such as high definition images in particular.

Suppose that a parallel processing is done with search processings divided for respective tracking objects. Then the number of processors required may vary depending on the number of the tracking objects, and if the number of the tracking objects is smaller than the number of processors, the processing capacity of the apparatus will not be used fully. Conversely, if the number of the tracking objects is larger than the number of processors, then some processings that cannot be assigned at a time will have to be executed later, which may also result in a redundancy of the processing capacity. Moreover, in this case, the image data size necessary for each search processing varies significantly with the size of a tracking object, and this can cause a shortage of memory capacity or a variation in data transfer time. Thus, presence of any significant variation in the processing time or the necessary memory size depending on the contents of the input image may pose an obstacle to the decision on the specifications of the apparatus or limit the general versatility of the apparatus.

On the other hand, according to the present embodiment, the search processing is divided for each knot, and the number of units of processing is increased with a smaller granularity for the unit of processing. As a result, changes in tracking conditions such as the number of tracking persons or the size of tracking objects have less influence on the processing time or necessary memory size, thus making it easier to evaluate the parameters. Therefore, the specifications of the apparatus can be determined easily, and the object tracking can be performed in a suitable environment without regard to the contents of the input image. Similarly, the apparatus allows parallel processings using the same processing procedure irrespective of the number of processors. The units of processing is generated on the order of several thousand per frame. Accordingly, they can be easily allocated to the respective processors, and besides each unit of processing can be completed in a relatively short time. The system therefore has a high scalability.

Also, since the unit of processing is the search processing for each knot, there is no dependence relationship between the units of processing themselves. This allows a pipeline processing in which the copying of a region of the next processing can be started while a contour search processing is being done for a knot. As a result, the time for copying to the local memory can be absorbed into the search processing time, and the resultant parallelization of processings and the synergistic effect thereof realize an even higher-speed processing. In particular, the time for copying and the time for search processing and their balance can be adjusted by changing the size of the region to be cut out of the contour image. This facility makes it possible to reflect the intention of the user as to whether priority is given to the tracking accuracy or the processing time.

Further, in order to generate a contour image, edge extraction is done after first grasping roughly the surfaces of subjects and dividing them into regions through the processes of smoothing and coarse-gradating the original image. In this manner, the boundaries between surfaces can be extracted as contours. In normal edge extraction processes, there has often been the case where many superfluous edges other than the contours are extracted or where the contours have breaks in them depending on the threshold value for extraction. And this has adversely affected the accuracy of tracking. In the present embodiment, as described above, emphasis is on the boundaries between surfaces, and therefore the contours can be easily extracted because of the wider tolerance of the threshold value.

Also, smoothing an image as a preprocessing of coarse-gradating allows extraction of information useful in grasping surfaces, thus enabling the apparatus to generate a more accurate coarse-gradated image and eventually a contour image with greater precision. For instance, the smoothing filter, the coarse-gradating unit, and the edge extraction filter used in contour image generation as described above can all be used in a process of raster scanning, and such a process is independent for each line. This will also realize a high-speed processing. Also, the contour image generated in the present embodiment has linear contours having a width equivalent to a pixel, so that there is no need for a process of thinning the lines for likelihood observation.

Second Embodiment

In the first embodiment of the present invention, search regions are cut out in one-on-one correspondence to knots, and a contour search request is issued for each knot. In a second embodiment thereof, a contour image is divided into regions of a predetermined size in advance, and a contour search request is issued for each region after the division. The structures of a tracking apparatus 14 and an observing unit 30 are the same as those shown in FIG. 4 and FIG. 6, and the principal processing procedure is also the same as the one described in the first embodiment. Hereinbelow, the repeated description of the same processings as in the first embodiment will be omitted, and a description will be given focusing the points different from the first embodiment.

Figure 16:
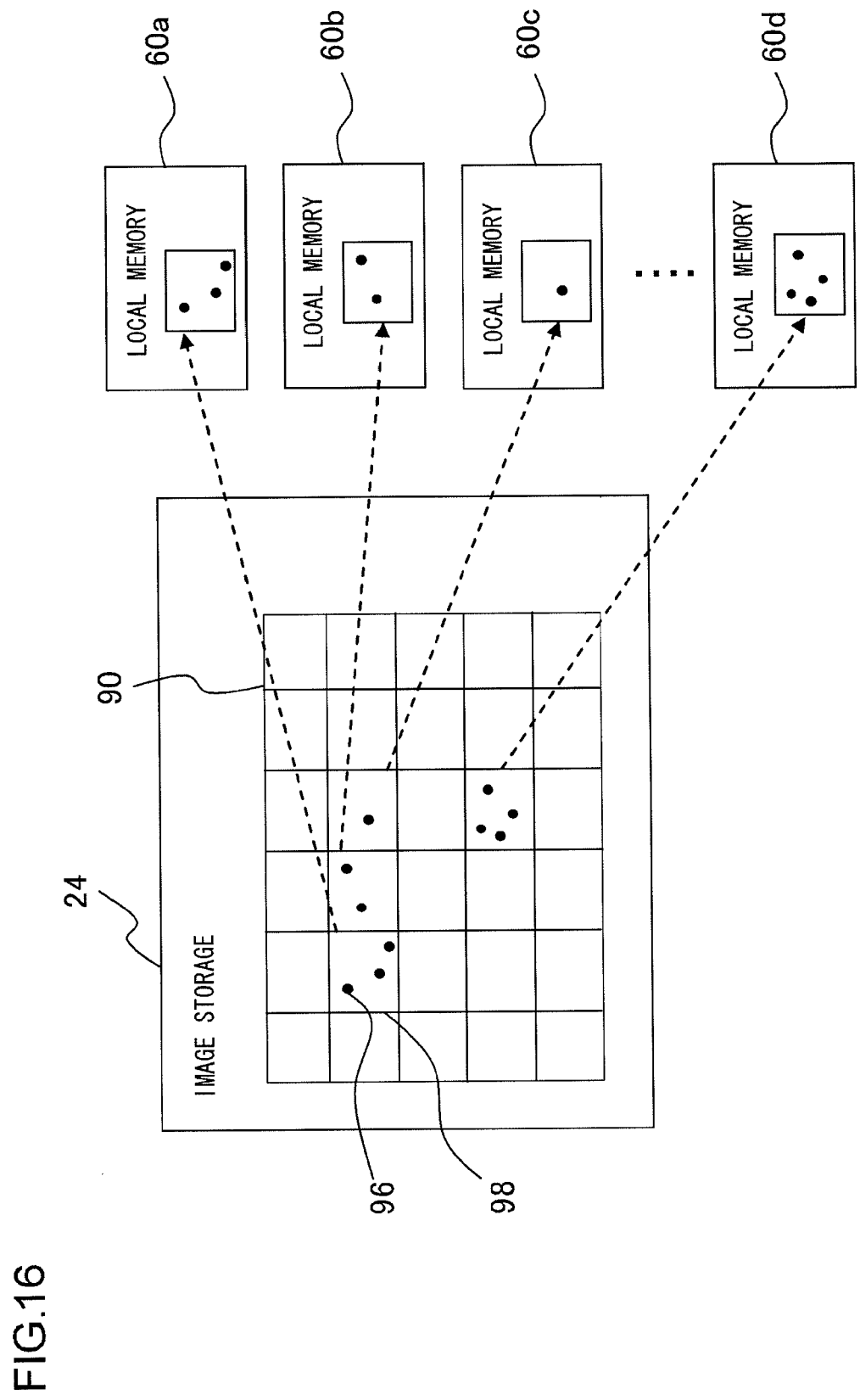
FIG. 16 schematically illustrates how, in a second embodiment, image data on regions after division are copied from a contour image stored in an image storage to each local memory.

FIG. 16 schematically illustrates how, in the present embodiment, the first processor 58*a*, the second processor 58*b*, the third processor 58*c*, . . . , and the Nth processor 58*n* of the contour searching unit copy the image data on the regions after the division from the contour image stored in the image storage 24 to their respective local memories 60*a*, 60*b*, 60*c*, . . . , and 60*n*. In the present embodiment, the contour image is divided irrespective of the positions of the knots. In FIG. 16, the contour image 90 is divided into six equal parts horizontally and five equal parts vertically. It is to be noted that the number of divisions is determined in advance by making sure that the size of each region 98 after the division does not exceed the capacity of each of the local memories 60*a*, 60*b*, 60*c*, . . . , and 60*n*. Note also that it is not always necessary that the division be one into equal parts. In any cases, predetermined coordinate information on the division pattern may be stored in the image storage 24 or the like, and the information may be read out by the contour image clipping unit 50.

Then the contour image clipping unit 50 determines which region the knots 96 of the candidate curve belongs to about all the candidate curves defined by the particles as determined by the sampling unit 29. Then the contour image clipping unit 50 extracts a region 98 containing the knots 96 and issues a contour search processing request containing information regarding the region and coordinate information on all the knots contained in the region 98 to the contour search task queue 52. If identification information on the regions 98 after the division, associated with the coordinate information on the boundary lines of the division pattern, is stored in the image storage 24, then the identification information only may suffice as the information regarding the region to be covered by the contour search request.

Upon reading one contour search processing request from the contour search task queue 52, the first processor 58*a*, the second processor 58*b*, the third processor 58*c*, . . . , and the Nth processor 58*n* of the contour searching unit 56 copy the image data on the specified region 98 from the contour image 90 stored in the image storage 24 to the subordinate local memories, based on the identification information on the specified region 98 or the like. Then the processors search for a contour closest to the knot within the copied region, based on the coordinate information on the knot. When there are a plurality of knots contained in the copied region, the processors search for the contours successively for all the knots and output the scoring result for each knot to the likelihood acquiring unit 54. Upon completion of the search for all the knots contained in the copied region, the processors read the next contour search processing request from the contour search task queue 52 and repeat the same processing as described above.

For example, in the tracking of a person, the knots for which a contour is searched may be concentrated in the vicinity of the contour of the person. With the knots being close to one another, their respective search regions may often be overlapped with each other. The present embodiment, using this characteristic, reduces the frequency of copying the regions. And the efficiency of the processing is enhanced by carrying out the search processing for a once copied region all at once irrespective of which candidate curves the knots belong to.

In this case, too, similar to the first embodiment, the likelihood acquiring unit 54 can acquire the likelihood for each candidate curve by referencing the information associating the information on knots with the identification information on the candidate curves to which respective knots belong.

According to the present embodiment as described above, a contour image is divided in a predetermined pattern, and the processings of contour search are divided for the respective regions after the division and assigned to a plurality of processors for parallel processings. The processors copy the divided regions to the respective local memories and conduct a search for contours within the copied regions for all the knots contained in the regions without regard to the candidate curves. Due to the characteristic of the particle filter, there may often be the case where a plurality of candidate curves are close to each other and thus a number of knots are present within a limited region. In such a case, however, search for a plurality of knots is done using a once copied region, thereby improving efficiency. As a result, the processing can be accomplished with even higher speed because of the synergistic effect of the parallel processings and the use of the local memories as described in the first embodiment.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

For example, in the first embodiment, the contour image generator 22 includes the smoothing filter 62, the coarse-gradating unit 64, and the edge extraction filter 66 as shown in FIG. 9, and a contour image is generated through the processings by these structural components. However, the contour image generator 22 to be employed may be a common edge extractor. For example, the extractor may be a combination of a smoothing filter 62 and an edge extraction filter 66 only. When, for instance, there are no complex changes in the surfaces of the tracking object or in the background, the contour image can be generated by an edge extractor alone. In such a case, too, the likelihood can be observed by conducting an edge search using the generated edge image. And the parallelization of the processings and so on may realize a high-speed tracking process.

Also, the contour image generator 22 may generate a contour image by the use of a not-shown foreground extractor. For example, if images of a soccer match are the input images and the movements of the players are to be tracked, the principal background is the ground and the players are in uniforms, so that the pixel values for them are limited in variation. In such a case, the contours of the tracking objects can be extracted accurately by a general foreground extraction processing. In order to enable the contour image generator 22 to select which of the above-described processings depending on the type of input image, a table of their association may be prepared. Or the arrangement may be such that the user changes the setting.

Moreover, the contour image generator 22 may be used in an image processing apparatus other than the tracking apparatus 14. For example, the contour image generator 22 may be incorporated into an automatic photo-taking apparatus, so that an image of a subject may be once taken in and then a contour image of the subject may be generated by the contour image generator 22. In this case, the position of the subject can be calculated from the contour image, and the information can be fed back to a controller for controlling the camera orientation or position, which makes an automatic adjustment to put the subject in the center or desired position in the photo. Or it may be incorporated into a retouching apparatus. In this case, functions, such as applying a desired retouching to the regions other than a specific object or the inner region of an object only, can be accomplished by extracting contours of the subject in the input image.

Furthermore, there may be applications under such circumstances as when the contours of letters are blurry on documents sent by fax or in captions on the images of a dubbed video-tape. In this case, the blurry letters may be taken in as images and inputted to the contour image generator 22, which can place boundaries in the blurry parts and thus clarify the contours of the letters. Therefore, the apparatus can also be advantageously utilized in optical character readers (OCR) or data format converters.

INDUSTRIAL APPLICABILITY

As described hereinabove, the present invention can be applied in such information processing apparatuses as visual tracking apparatus, computers, game devices, image pickup apparatus, and video playback equipment.

The invention claimed is:

1. An object tracking apparatus comprising:
   a candidate contour determining unit configured to determine a candidate contour of an object to be tracked in a second image frame based on an estimated existence probability distribution of the object in a first image frame, the first image frame and the second image frame being in an image stream, the image stream constituting captured moving image data on the object to be tracked;
   an observing unit configured to observe a likelihood of the candidate contour by matching the candidate contour determined by the candidate contour determining unit against an edge image of the second image frame; and
   a result acquiring unit configured to estimate the existence probability distribution of the object in the second image frame, based on the likelihood observed by the observing unit,
   the observing unit including:
      a plurality of search units configured to perform, in parallel and for each knot, a processing to search for a nearest edge from each knot constituting a curve of the candidate contour; and
      a likelihood acquiring unit configured to acquire the likelihood for each candidate contour by integrating the results of search obtained by the search units.

2. An object tracking apparatus according to claim 1, wherein the candidate contour determining unit determines the candidate contour by generating particles used for a particle filter on a parameter space defining the candidate contour of the object in the second image frame, based on the estimated existence probability distribution of the object in the first image frame, and transiting the respective particles according to a predetermined motion model.

3. An object tracking apparatus according to claim 1, wherein the search unit cuts out image data on a region including a knot for search processing and a search area thereof from the edge image, stores the image data in a subordinate local memory, and conducts the search processing.

4. An object tracking apparatus according to claim 3, wherein the search unit cuts out image data on a rectangular region with the knot for search processing as a center of gravity from the edge image.

5. An object tracking apparatus according to claim 3, wherein the search unit cuts out image data on a region including a knot for search processing from the edge image, the region being one of the regions generated by dividing the edge images by a predetermined division pattern, and stores the cut-out image data in the local memory, and
   after the search processing for the knot is completed, the search unit continuously performs the search processing for all knots, included in the region, which are stored in the local memory.

6. An object tracking apparatus according to claim 3, wherein the search unit varies the size of the region to be cut out according to the magnitude of the candidate contour.

7. An object tracking apparatus according to claim 3, wherein, in a period during which the search unit performs search processing for a knot, the search unit starts to store a region cut out from the edge image for a subsequent search processing for another knot, in the local memory.

8. An object tracking apparatus according to claim 7, wherein the search unit measures time required for storage processing in the local memory and time required for the search processing, and adjusts the size of the region to be cut out in such a manner that the times required therefor meet a predetermined condition.

9. An object tracking apparatus according to claim 3, wherein the search unit references an optimal size of the region to be cut out relative to the number of objects to be tracked and determines the size of the region to be cut out according to the actual number of objects to be tracked.

10. An object tracking apparatus according to claim 3, the search unit including:
- a contour image clipping unit configured to store a processing request, for a contour search, including coordinate information on a knot for which search processing is conducted and information on the region cut out from the edge image associated with said knot, in a task queue; and
- a plurality of search processors configured to successively read the processing request from the task queue, store the region cut out from the edge image in the local memory and conduct the search processing.

11. An object tracking method comprising:
- determining a candidate contour of an object to be tracked in a second image frame based on an estimated existence probability distribution of the object in a first image frame, the first image frame and the second image frame being in an image stream, the image stream constituting captured moving image data on the object to be tracked;
- generating an edge image of the second image frame and storing the edge image in a memory;
- performing, in parallel and for each knot, a processing to detect a nearest edge from each knot, constituting a curve of the candidate contour, in a manner such that image data on a partial region of the edge image stored in the memory is read out and searched; and
- acquiring a likelihood for each candidate contour by integrating the results of edge detection so as to estimate the existence probability distribution of the object in the second image frame.

12. A program embedded in a non-transitory computer readable medium, the program comprising:
- a candidate contour determining module operative to determine a candidate contour of an object to be tracked in a second image frame based on an estimated existence probability distribution of the object in a first image frame, the first image frame and the second image frame being in an image stream, the image stream constituting captured moving image data on the object to be tracked;
- a generating and storing module operative to generate an edge image of the second image frame and storing the edge image in a memory;
- an edge detecting module operative to perform, in parallel and for each knot, a processing to detect a nearest edge from each knot, constituting a curve of the candidate contour, in a manner such that image data on a partial region of the edge image stored in the memory is read out and searched; and
- an acquiring and estimating module operative to acquire a likelihood for each candidate contour by integrating the results of edge detection so as to estimate the existence probability distribution of the object in the second image frame.

13. A non-transitory computer-readable medium encoded with a program executable by a computer, the program comprising:
- a candidate contour determining module operative to determine a candidate contour of an object to be tracked in a second image frame based on an estimated existence probability distribution of the object in a first image frame, the first image frame and the second image frame being in an image stream, the image stream constituting captured moving image data on the object to be tracked;
- a generating and storing module operative to generate an edge image of the second image frame and storing the edge image in a memory;
- an edge detecting module operative to perform, in parallel and for each knot, a processing to detect a nearest edge from each knot, constituting a curve of the candidate contour, in a manner such that image data on a partial region of the edge image stored in the memory is read out and searched; and
- an acquiring and estimating module operative to acquire a likelihood for each candidate contour by integrating the results of edge detection so as to estimate the existence probability distribution of the object in the second image frame.

* * * * *